Patented Nov. 4, 1952

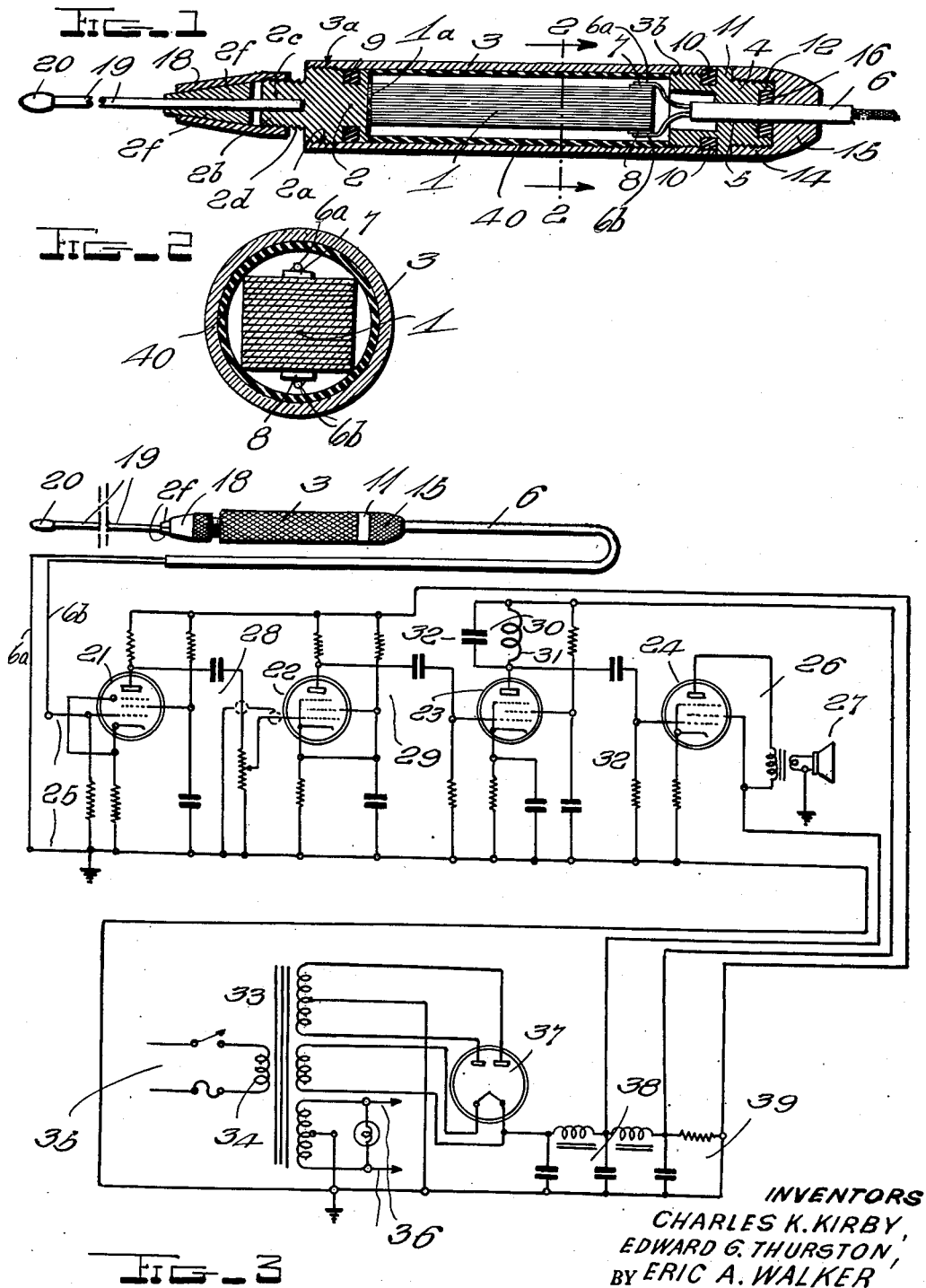

2,616,415

UNITED STATES PATENT OFFICE 2,616,415

DETECTOR FOR LOCATING GALLSTONES AND OTHER HARD FOREIGN MATTER EMBEDDED ADJACENT BODY TISSUE

Charles K. Kirby, Philadelphia, and Edward G. Thurston and Eric A. Walker, State College, Pa.

Application February 15, 1950, Serial No. 144,244

12 Claims. (Cl. 128—2)

Our invention relates broadly to diagnostic apparatus for use by physicians and surgeons, and more particularly an electronic apparatus for locating gallstones and other hard substances embedded adjacent body tissues.

One of the other objects of our invention is to provide a diagnostic apparatus for use by physicians and surgeons in detecting gallstones in a patient with minimum recourse to surgery.

Another object of our invention is to provide a compact construction of gallstones detector in which differences in the characteristics of gallstones and adjacent body tissue may be made audibly apparent through an acoustic system for facilitating diagnostic investigations of the condition of a patient.

Still another object of our invention is to provide a construction of probe for detecting gallstones embedded in adjacent body tissue in which electrical potentials are generated upon contact of a probe with the gallstones for producing acoustic response through an electrical acoustic system for rendering apparent the presence of the gallstones.

Still another object of our invention is to provide an electron tube amplification system and associated sound reproducer system responsive to conditions determined by the movement of a probe whereby the electron tube amplification system is provided with circuit means tuned to pass audio frequencies displaced from the frequency spectrum from any audio resonance frequency present in the probe structure for rendering the system sensitive to frequencies generated by contact of the probe with gallstones adjacent the body tissue being diagnosed.

Another object of our invention is to provide a construction of probe for a gallstone detector which includes an electroacoustical generator operative to develop potentials under conditions of contact of the probe with gallstones where the probe is highly damped and where the generator operates into an electron tube amplifier system that is peaked to respond to frequencies generated incident to contact of said probe with gallstones as distinguished from adjacent body tissue, for audibly operating an electrical acoustic system.

Other and further objects of our invention reside in the construction of probe for a gallstone detector as set forth more fully in the specification hereinafter following by reference to the accompanying drawings, in which:

Figure 1 is a longitudinal sectional view through a probe constructed in accordance with our invention; Fig. 2 is a vertical sectional view taken on line 2—2 of Fig. 1; and Fig. 3 is a schematic and diagrammatic circuit diagram showing the electrical circuit of the electron tube amplification system and electrical sound reproducer associated with the probe of our invention.

The need for locating gallstones with minimum surgery will be understood from considerations of the delicate formation of the biliary tract wherein the bile ducts are small tubular structures which convey bile from the liver to the intestine. The right and left hepatic ducts which drain the right and left lobes of the liver join to form the common hepatic duct which, in turn, is joined by the cystic duct from the gall bladder to form the common bile duct. After joining with the pancreatic duct, the common bile duct terminates in a small sphincter, or circular muscle, in the wall of the intestine. The sphincter allows bile to flow into the intestine but effectively seals the duct against reverse flow.

Gallstones form in the gall bladder (rarely in the bile ducts) and may pass through the bile ducts into the intestine if they are small enough to go through the sphincter. If not, they are arrested at the sphincter and block the flow of bile into the intestine.

Usually the obstructing stones cannot be seen or felt, and present methods of detecting them are often inadequate. The most effective method consists of repeatedly passing a grasping forceps up and down the ducts, removing the stones as they are encountered. Passage of instruments and catheters through the sphincter into the intestine is regarded as strong evidence that the obstruction has been relieved but does not demonstrate that all stones adjacent to the sphincter or in the proximal ducts have been removed. The use of X-rays, taken during operation with a radio-opaque dye injected into the ducts, has been suggested but not widely used.

An equally important problem is whether to open the common bile duct to explore for stones during operations for removal of the gall bladder. In many instances the presence or absence of stones in the bile ducts cannot be determined in any other way. Opening of the common bile duct is undesirable if unnecessary. The instrument of our invention which can be passed through the cystic duct upon removal of the gall bladder to detect the presence of stones in the bile duct is, therefore, of considerable value.

The detection instrument of our invention explores the shock wave produced when a metal probe encounters a gallstone. The detector employs an electroacoustic transducer using piezoelectric-crystal elements mounted at the back end of a slim rod-like probe and connected through an amplifier to a loudspeaker.

We have found that characteristic signals are produced whenever the sensitive probe comes into contact with a stone. The audible signal which consists either of a clicking noise when the probe is tapped against the hard surface of a stone, or of a scratching noise when the probe is scraped against a stone, is easily distinguished from a soft hissing produced when the probe is slid against tissues.

If the probe is undamped a ringing sound will result and can be produced by almost any slight shock, including impact with even relatively soft bodies. If the probe is highly damped a sharp click results and can usually be created only by striking the probe with a hard object. This latter effect is the one most desirable to achieve in the detector of our invention. The natural damping produced by the walls of the ducts helps to create such an effect, and audio resonances are further suppressed by a tuned circuit in the amplifier, tuned to pass audio frequencies but displaced from any audio resonance frequency present in the probe structure.

The transducer is mounted at the back end of the probe inside the probe handle. The construction has been found to provide a more sensitive transducer which is inexpensive to produce and which is entirely practical for production on a mass scale.

Referring to the drawings in detail the probe as shown in Figs. 1 and 2 comprises an electroacoustical generator 1 which is sensitive to mechanical displacement and minute pressure, for generating electrical potentials. We may employ for this purpose any one of several sensitive elements such as a stack of ceramic piezoelectric elements soldered together in series. This material is available in sheets 10 mils thick, and is quite rugged, and is capable of withstanding temperatures up to 117° C. As indicated by reference character 1, we form a sensitive element by soldering together fourteen of these sheets to produce a packet 0.1875 by 0.25 by 1.5 inches. While fourteen of these sheets are shown in the form of our invention illustrated it is to be understood that we have specified fourteen for purposes of explaining our invention and we intend no limitations with regard to the number of sheets. It is sufficient to point out that a multiplicity of said sheets are stacked to form a sensitive body that is substantially in the shape of a parallelopiped. The cross section of the body is not square, but rectangular, one transverse side being longer than the other. The stacked body has an end portion 1a which is fastened to the circular conductive face of a header 2. The header 2 is a metallic cylindrical plug which is externally screw-threaded as represented at 2a for receiving internal screw threads 3a formed on the end of the cylindrical metallic housing 3. The opposite end of housing 3 is also provided with internal screw threads 3b which engage external screw threads on cylindrical metallic header 4 closing the opposite end of the housing. The cylindrical metallic header 4 is provided with an axially extending passage 5 therein through which a pair of electrical conductors 6a and 6b extend in a flexible casing of insulation material indicated at 6. The electrical conductors 6a and 6b in flexible casing 6 are fanned-out interiorly of housing 3 and connect to electrodes 7 and 8 which are the electrodes for the electroacoustical generator 1 as shown more clearly in Fig. 2. These electrodes are applied to the longer side of the packet or parallelopiped constituting the electroacoustical generator 1, thereby allowing adequate space for the passage of the ends of the conductors 6a and 6b around the sides of the packet.

The packet or parallelopiped 1 is damped in its operation by contact at its peripheral edges with the interior wall of an insulation sheath 40 that is set into the interior of the metallic wall of housing 3, as represented more clearly in Fig. 2. The headers at each end of housing 3 are sealed with respect to housing 3 against entry of moisture by means of gaskets 9 and 10 which are set in grooves in headers 2 and 4, respectively, and which establish an internal seal with the interior surface of housing 3. In the case of cylindrical header 4 the gasket 10 sets in both an annular groove in header 4 and in an internal groove interiorly of housing 3. The header 4 includes a flange portion 11 which abuts against the end of housing 3. An integral projecting portion 12 on header 4 is externally screw-threaded to receive the internally screw-threaded sleeve 14 of the metallic cap 15 which surrounds the electrical conductors 6. The metallic cap 15 compresses gasket 16 within an annular recess formed in the end of projecting portion 12 of header 4 for establishing a fluid-tight entrance for the electrical conductors 6a and 6b.

The connection between the end portion 1a of packet 1 and the conductive face of header 2 is made through a layer of cement forming a firm mechanical interconnection between the piezoelectric generator 1 and the header 2. The header 2 has an integrally formed reduced section 2b thereon having a sample socket 2c in the end thereof and having external screw-threads 2d formed on the projecting cylindrical portion thereof. Outwardly projecting sets of coacting spring jaws 2f are encompassed by the tapered sleeve 18 which is internally screw-threaded at one end thereof to engage the external screw threads 2f on header 2. The spring jaws 2d are spaced to permit the entry of rod 19 carrying dilator 20 on the end thereof. Rod 19 fits into socket 2c and is maintained in position by tightening sleeve 18 with respect to screw-threads 2d for clamping spring jaws 2f against the sides of rod 19. Thus, the dilator may be moved over the surface of tissues to positions where the dilator 20 may contact gallstones transmitting a force to the header 2 which in turn transmits the force through end portion 1a of the electroacoustical generator 1 into the electroacoustical generator 1, producing by such applied force the generation of electrical potentials causing a current flow across electrodes 7 and 8 through electrical conductors 6.

In Fig. 3 we have shown a schematic circuit diagram of one form of electron tube amplifier and loudspeaker unit which is associated with the probe embodying our invention as heretofore described. In the circuit arrangement shown, a four-stage amplifier is provided including electron tubes 21, 22, 23 and 24 having an input circuit 25 connected to conductors 6 of the probe and an output circuit 26 connected to the electrical sound reproducing loudspeaker unit 27. The electron tube amplifier stages for tubes 21 and 22 are resistance-capacitance coupled, as represented at 28. The third stage of amplification embodying tube 23 is resistance-capacitance coupled to the output of the second stage of amplification as shown at 29. The output of the third stage of amplification embodying tube 23 has a single tuned circuit 30 therein constituted by inductance 31 and capacitance 32 forming a plate load in order to lower the noise output and improve the signal quality. The tuned circuit 30 has a Que of 25 and a resonance of 1.5 kilocycles. The output of tube 23 is coupled to the input of electron tube 24 through resistance-capacitance coupling, represented at 32. Power for operating the power circuits of each of the electron tubes is obtained from the transformer system 33 having primary winding 34, connected to power circuit leads 35, extending to the conventional 110 volt, 60 cycle domestic power supply circuit. The cathodes for the several electron tubes are energized from transformer secondary winding 36 by parallel circuit connections extending from the terminals of the secondary winding 36 to the several cathodes. The plate potential for the several tubes is obtained from the full-wave rectifier 37 operating through filter circuit 38 and the potentiometer circuit 39.

Tuned circuit 30 constituted by inductance 31 and capacitance 32 suppresses audio resonances in the amplifier and tunes the amplifier to pass audio frequencies which are displaced in the audio frequency spectrum from any audio frequency to which the probe structure itself may be resonant. Tuned circuit 30 operates to peak the amplifier system so that it is sensitive to those frequencies generated incident to the striking of dilator 20 against the hard surface of a gallstone. By virtue of the high damping of the probe and the tuning of the amplification system a clicking sound is produced in the electrical sound reproducer 27 when the probe dilator 20 is tapped against the hard surface of a gallstone or a scratching noise is produced as the dilator is scraped against the surface of a gallstone. These sounds are very readily distinguished from the soft hissing sound produced when the probe dilator is slid against a tissue. Thus the tuning of the amplifier system by circuit 30 coacts with the damping of the probe in the construction of a successful detector for locating gallstones.

The length of rod 19 may be increased as desired in applying the principles of our invention to kidney stone detection. The rod 19 need not be metallic but may be ceramic or bonded materials such as cloth impregnated with plastic material having good acoustic transmission. Any material forming a good transmitter of sound waves may be used for the material of rod 19. The function of rod 19 is to form a transmitting medium for acoustic waves to the electroacoustic device within the body of the probe.

The damping of the electroacoustical generator is accomplished by the contacting frictional relation of the parallelopiped or packet forming generator 1, with the interior wall of the housing 3, the edges of the generator wiping the interior tubular wall of the sheath of insulation material 40.

The fact that all exposed external parts of the probe are metal permits the probe to be sterilized and rendered free of germs in preparation for each diagnosis. We have successfully used stainless steel for all of the metallic parts of the probe.

Throughout the specification and claims where we have referred to the term "gallstones," it is desired to be understood that this term is to be considered as embracive of any hard surface material or foreign body which may be embedded adjacent body tissue. That is to say, our method and apparatus is applicable not only to the location of gallstones but also for the probing of metallic bodies such as bullets or fragments of metal, glass, steel, etc., lodged in wounds, and we do not intend the term "gallstones" to be restricted only to the term as used in the medical profession.

While we have found the structure and circuit arrangement disclosed herein highly practical and successful in operation, we realize that modifications and changes may be made and we desire that it be understood that no limitations upon our invention are intended other than may be imposed by the scope of the appended claims.

What we claim as new and desire to secure by Letters Patent in the United States is as follows:

1. An electronic apparatus for locating hard bodies embedded adjacent body tissue, comprising a probe having a dilator on the end thereof, a rod extending therefrom, a header connected with said rod, a tubular housing connected with said header, a header closing the opposite end of said housing, said last mentioned header having a passage for electrical conductors extending therethrough, a piezo-electric crystal element having points of different potential connected with said electrical conductors and connected with said first mentioned header and an electrically responsive system connected with said electrical conductors and responsive to contact of said dilator with hard bodies embedded adjacent body tissue for detecting the presence of such hard bodies and distinguishing the hard bodies from adjacent body tissue.

2. An electronic apparatus for locating gallstones embedded adjacent body tissue, comprising a probe having a dilator on the end thereof, a rod extending therefrom, a header connected with said rod, a tubular housing connected with said header, a header closing the opposite end of said housing, said last mentioned header having a passage for conductors extending therethrough, a piezo-electric generator having a linearly extending portion terminating in abutment end portions, one of said abutment end portions being secured to said first mentioned header and terminal connections secured adjacent the other abutment end portion and connected with points of opposite potential on said piezo-electric generator, conductors connected with said terminal connections and leading through the passage in said last mentioned header, an electron tube amplification system having input and output circuits, a connection between said conductors and said input circuit, a sound reproducer in said output circuit and means associated with said circuits for increasing the amplitude of response of said electron tube amplification system to frequencies incidental to the establishment of contacts between said dilator and gallstones embedded in adjacent body tissue for producing an acoustic response in said sound reproducer characteristic of the said contacts with gallstones and distinguishing the contacts with gallstones from contacts with adjacent body tissue.

3. An electronic apparatus for locating foreign bodies embedded adjacent body tissue, comprising a probe having a dilator on the end thereof, a rod extending therefrom, a header connected with said rod, a tubular housing connected with said header, a header closing the opposite end of said housing, said last mentioned header having a passage for electrical conductors extending therethrough, a piezoelectric device having an end portion secured to said first mentioned header and having electrode faces electrically connected with said electrical conductors which extend through the passage in said last mentioned header, an electron tube amplification system having input and output circuits, connections between said electrical conductors and said input circuit, a sound reproducer, connections between said sound reproducer and said output circuit, and means for sensitizing said electron tube amplification system to frequencies incidental to the contact of said dilator with foreign bodies for distinguishing said foreign bodies from adjacent body tissue and detecting the presence of said foreign bodies.

4. An electronic apparatus for locating foreign bodies embedded adjacent body tissue, comprising a probe having a dilator on the end thereof, a rod extending therefrom, a header connected with said rod, a tubular housing connected with said header, a header closing the opposite end of said housing, said last mentioned header having a passage for electrical conductors extending therethrough, a piezoelectric device having an end portion secured to said first mentioned header and having electrode faces electrically connected with said electrical conductors which extend through the passage in said last mentioned header, an electron tube amplification system having input and output circuits, connections between said electrical conductors and said input circuit, a sound reproducer, connections between said sound reproducer and said output circuit, and an audio frequency tunable circuit in said amplifier for adjusting said amplifier for peak response on frequencies incidental to contacts of said dilator with foreign bodies embedded adjacent body tissue for detecting the presence of said foreign bodies and distinguishing the foreign bodies from adjacent body tissue.

5. An electronic apparatus for locating hard bodies embedded adjacent body tissue, comprising a probe having a dilator on the end thereof, a rod extending therefrom, a header connected with said rod, a tubular housing connected with said header, a header closing the opposite end of said housing, said last mentioned header having a passage for electrical conductors extending therethrough, a linearly extending piezo-electric device enclosed by said tubular housing and damped for operation therein, said device being connected with said first mentioned header at the end thereof and having electrodes adjacent the opposite end thereof, electrical conductors connected with said electrodes and extending through the passage for the electrical conductors in said second mentioned header, an electron tube amplifier having input and output circuits, a sound reproducer connected with said output circuit, connections between said input circuit and said electrical conductors, and means in said electron tube amplifier tuned to pass frequencies displaced from the frequencies characteristics of, and incidental to a contact established by said dilator with hard bodies embedded adjacent body tissue for detecting the presence of said hard bodies and distinguishing the hard bodies from adjacent body tissue.

6. A probe for detecting hard bodies embedded adjacent body tissue comprising a tubular housing, a header on each end of said housing and forming fluid-tight seals with opposite ends of said housing, a chuck formed on one of said headers, a dilator removably mounted in said chuck and forming a probe for contacting hard bodies embedded in body tissue and constituting a motion transmitting rod for transmitting movements incident to the striking of contacting hard bodies, the other of said headers having an axial passage therethrough, a piezo electric generator disposed within said housing and extending linearly therethrough, said generator having one end fastened to said first mentioned header substantially in alignment with said chuck, electrodes on said generator, electrical conductors connected with said electrodes and extending through the passage in said second mentioned header, and means for sealing said electrical conductors with respect to said second mentioned header adjacent the entry thereof into said housing.

7. A probe for detecting hard bodies embedded in body tissue as set forth in claim 6 in which said generator is damped by contact of the linear edges of said generator with the inside walls of said housing.

8. In a probe for detecting hard bodies embedded in body tissue as set forth in claim 6 in which said generator comprises a stack of ceramic piezoelectric elements connected together in series.

9. In a probe for detecting hard bodies embedded in body tissue as set forth in claim 6 in which said piezo-electric generator comprises a stack of elements extending longitudinally within said housing wherein the transverse dimension of said stack substantially fills said housing and in which the longitudinal dimension of the stack exceeds the dimension of any one of the transverse dimensions thereof.

10. In a probe for detecting hard bodies embedded in body tissue as set forth in claim 6 in which said piezo-electric generator has a longitudinal dimension exceeding its lateral dimension and in which the ends thereof are substantially parallel to each other.

11. An electronic apparatus for locating hard bodies embedded adjacent body tissue comprising an acoustic wave transmitting probe having a dilator on the remote end thereof and an acoustic wave transmitting rod extending therefrom, a header connected with said rod, a tubular housing connected with said header, another header enclosing the opposite end of said housing, said last mentioned header having an axially extending passage for electrical conductors extending therethrough, an electroacoustic element having electrodes connected with said conductors, said electroacoustic element being connected with said first mentioned header and an electrically responsive system connected with said conductors and responsive to the contact of said dilator with hard bodies embedded in body tissue for detecting the presence of said hard bodies and distinguishing the hard bodies from adjacent body tissue.

12. An electronic apparatus for locating hard bodies embedded adjacent body tissues, comprising a probe having a dilator on the end thereof, a rod extending therefrom, a metallic header connected with said rod, a tubular metallic housing connected with said metallic header, a metallic header closing the opposite end of said metallic housing, said last mentioned metallic header having an axial passage for electrical conductors extending therethrough, a sleeve of insulation material disposed within said tubular housing and between said metallic headers, an electroacoustic element located within said sleeve of insulation material and insulatingly spaced from said metallic housing and from said last mentioned metallic header, and mechanically connected with said first mentioned metallic header, said electroacoustic element having spaced electrodes thereon, electrical conductors connected with said spaced electrodes and extending through the axial passage in said last mentioned metallic header, and an electrically responsive system connected with said conductors and responsive to the contact of said dilator with hard bodies embedded in body tissue for detecting the presence of said hard bodies and distinguishing the hard bodies from adjacent body tissue.

CHARLES K. KIRBY.
EDWARD G. THURSTON.
ERIC A. WALKER.

REFERENCES CITED

The following references are of record in the file of this patent:

UNITED STATES PATENTS

| Number | Name | Date |
|---|---|---|
| 902,753 | Marshall | Nov. 3, 1908 |
| 2,393,717 | Speaker | Jan. 29, 1946 |
| 2,437,697 | Kalom | Mar. 16, 1948 |
| 2,442,805 | Gilson | June 8, 1948 |
| 2,445,731 | Jaycox | July 20, 1948 |
| 2,487,035 | Weaver | Nov. 1, 1949 |